Sept. 22, 1925.
W. H. RAPEPORT
BUMPER AND FENDER
Filed Dec. 13, 1923
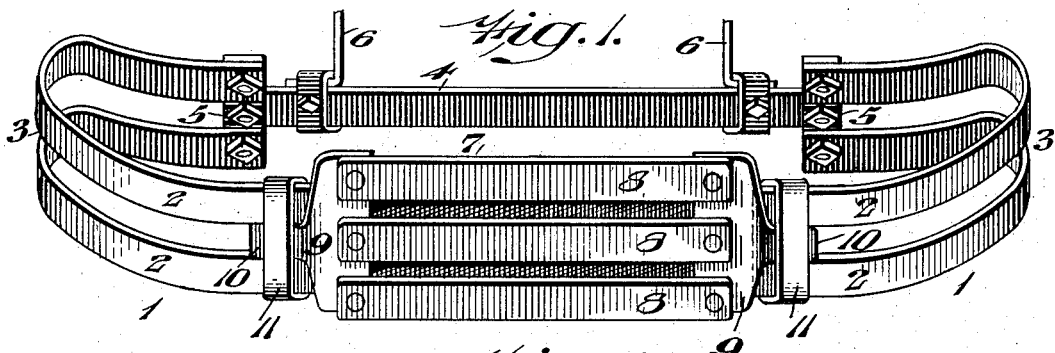
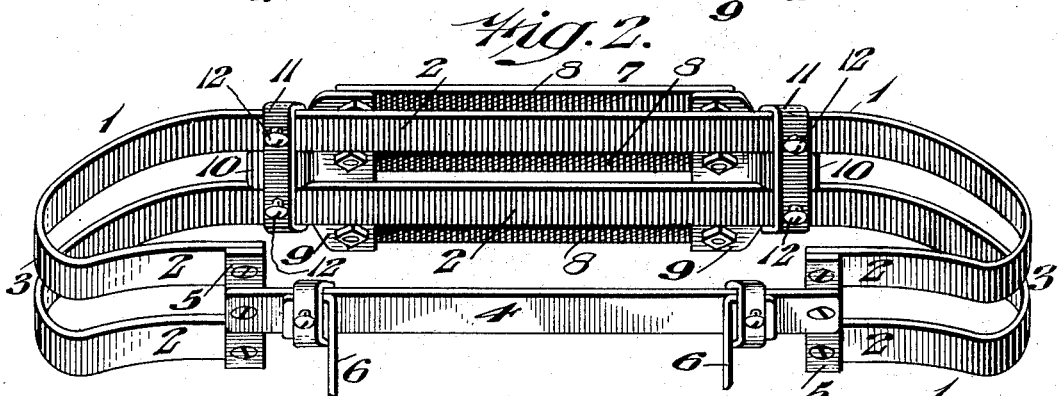
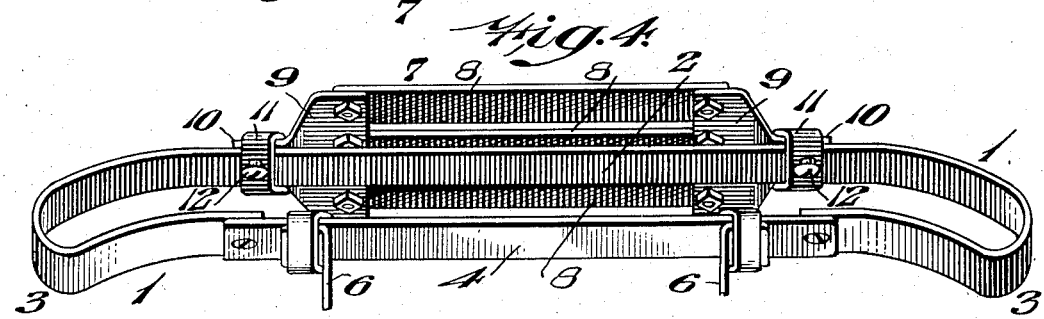
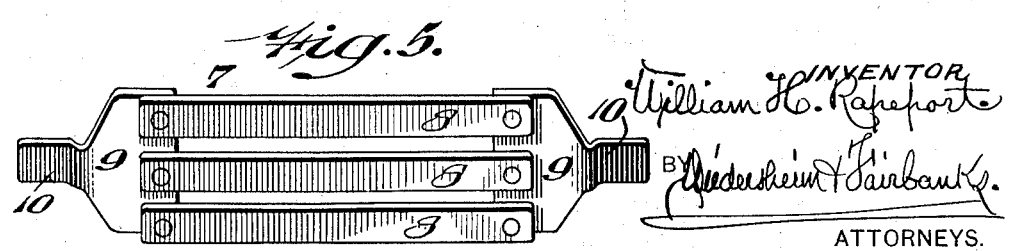

Patented Sept. 22, 1925.

1,554,657

UNITED STATES PATENT OFFICE.

WILLIAM H. RAPEPORT, OF PHILADELPHIA, PENNSYLVANIA.

BUMPER AND FENDER.

Application filed December 13, 1923. Serial No. 680,297.

*To all whom it may concern:*

Be it known that I, WILLIAM H. RAPEPORT, a citizen of the United States, residing in the city and county of Philadelphia, State of Pennsylvania, have invented a new and useful Bumper and Fender, of which the following is a specification.

My invention relates to a bumper and fender for an automobile or other vehicle, and consists of an additional or auxiliary member connected with a bumper or fender proper adapted to reinforce the front of the latter and add increased strength thereto without affecting the resiliency of the bumper or fender proper.

The invention is satisfactorily illustrated in the accompanying drawing, but the important instrumentalities thereof may be varied, and so it is to be understood that the invention is not limited to the specific details shown and described, as long as they are within the scope of the claims.

Figures 1 and 2 represent perspective views of a bumper and fender embodying my invention.

Figures 3 and 4 represent perspective views of a modified construction of Figures 1 and 2.

Figure 5 represents a perspective view of the additional resilient and strengthening member employed.

Similar numerals of reference indicate corresponding parts in the figures.

Referring to the drawings.

1 designates the frame or body of the bumper or fender proper consisting of the resilient front bars 2, the resilient inturned end bends 3 thereof, the resilient rear bar 4 and the connecting devices 5 for said rear bar 4 with the inner end terminals of the bends 3, the frame thus being of an effective resilient nature, it being adapted to be attached to the chassis of an automobile or other vehicle by the arms 6, or other suitable means for supporting the bumper or fender proper.

7 designates an additional or auxiliary member which is located in position on the frame or body 1, as in Figures 1, 2, 3, and 4, and detached therefrom in Figure 5. Said member 7 consists of parallel plates 8 of metal or other rigid material, brackets 9 to which the terminals of said plates 8 are screwed, bolted, or riveted and tongues 10 of loop-like form projecting laterally from said brackets.

On the said bars 2 of the frame or body 1 are the clevises 11 which are movable thereon and so adapted to be adjusted to the tongues 10 of the brackets 9. Then the clevises are fitted over said tongues, and the clevises are secured in their adjusted positions to the adjacent portions of the bars 2 by set screws, bolts or rivets or other means as at 12 in a firm and durable manner.

It will be seen that the member 7 is located on the front of the frame 1 and so reinforces and strengthens the bumper or fender proper thereat, it being adapted to receive the force of blows that may be imparted against it in case of collision or abutments without injuring the bumper or fender proper, while preserving the resiliency of the latter.

The front bars 2 may be two in number as shown in Figures 1 and 2, or in lieu thereof a single bar, as in Figures 3 and 4, but to the numbers thereof I do not limit myself, while the auxiliary member 7 is preferably a plurality of plates so as to provide a wide surface and overlap the top and bottom of the front bars or bar of the bumper or fender proper so as to remove said bars or bar from the impact of the blows or abutments to which the plate may be subjected and so guard the bumper or fender from injury by such blows or abutment.

Having thus described my invention what I claim as new and desire to secure by Letters Patent, is:—

1. In an automobile buffer, end loop attaching members, a bar at the buffer rear connecting said loops, or members, and means carried by said bar for attachment to an automobile frame, a pair of brackets at the buffer front detachably engaging said end loop attaching members and a plurality of spaced superimposed bars connecting the said brackets.

2. In an automobile buffer, end loop attaching members, a bar at the buffer rear connecting said loops, or members, means carried by said bar for attachment to an automobile frame, a pair of brackets at the buffer front detachably engaging said end loop attaching members, a plurality of spaced, superimposed bars connecting the said brackets, a clevis fitted over the free end of each bracket and an loop end member and a set screw for securing each clevis to place.

WILLIAM H. RAPEPORT.